(12) United States Patent
Dagedeviren et al.

(10) Patent No.: US 6,356,593 B1
(45) Date of Patent: Mar. 12, 2002

(54) DATA OPTIMIZED CODEC

(75) Inventors: Nuri Ruhi Dagedeviren, Red Bank, NJ (US); Lynn Emery Ditty, Northampton, PA (US); Donald Lars Duttweiler, Rumson, NJ (US); Gerard Joseph Pepenella, Blandon, PA (US); Dewayne Alan Spires, Plaistow, NH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/067,895

(22) Filed: Apr. 28, 1998

(51) Int. Cl.[7] ............................................... H04B 14/04
(52) U.S. Cl. ........................ 375/242; 375/222; 455/557
(58) Field of Search ................................. 375/219, 220, 375/221, 222, 242, 243, 254; 370/377, 384, 385, 359; 455/557; 463/41

(56) References Cited

U.S. PATENT DOCUMENTS 5,598,401 A * 1/1997 Blackwell et al. .......... 370/385
5,995,558 A * 11/1999 Betts et al. ................. 375/316
6,002,684 A * 12/1999 McVerry ..................... 370/359
6,069,921 A * 5/2000 Kaplan ....................... 375/243

* cited by examiner

*Primary Examiner*—Stephen Chin
*Assistant Examiner*—Chieh M. Fan
(74) *Attorney, Agent, or Firm*—Howard R. Popper

(57) ABSTRACT

Quantization noise, introduced into data transmission when analog signals are translated into PCM code using the logarithmic conversion of $\mu$-law or A-law rules necessary to accommodate the transmission of voice signals, limits the maximum attainable speed of data transmission. However, when the PCM code signals represent data (rather than voice signals), linear conversion of analog data signals into the PCM code would avoid such logarithmic quantization noise. To signal the translating codec that a digital modem call is being made, the digital modem allocates one or more of the least significant bit positions of the code representing the 2100 Hz answer-tone-with-phase-reversal (specified in ITU-T Recommendation G. 165) to send a repetitive pattern "P1" to signal to the associated codec that a digital modem connection has been made. When the codec detects the P1 pattern it will linearly convert analog data signals into PCM code, thereby reducing the introduction of logarithmic quantization noise.

23 Claims, 1 Drawing Sheet

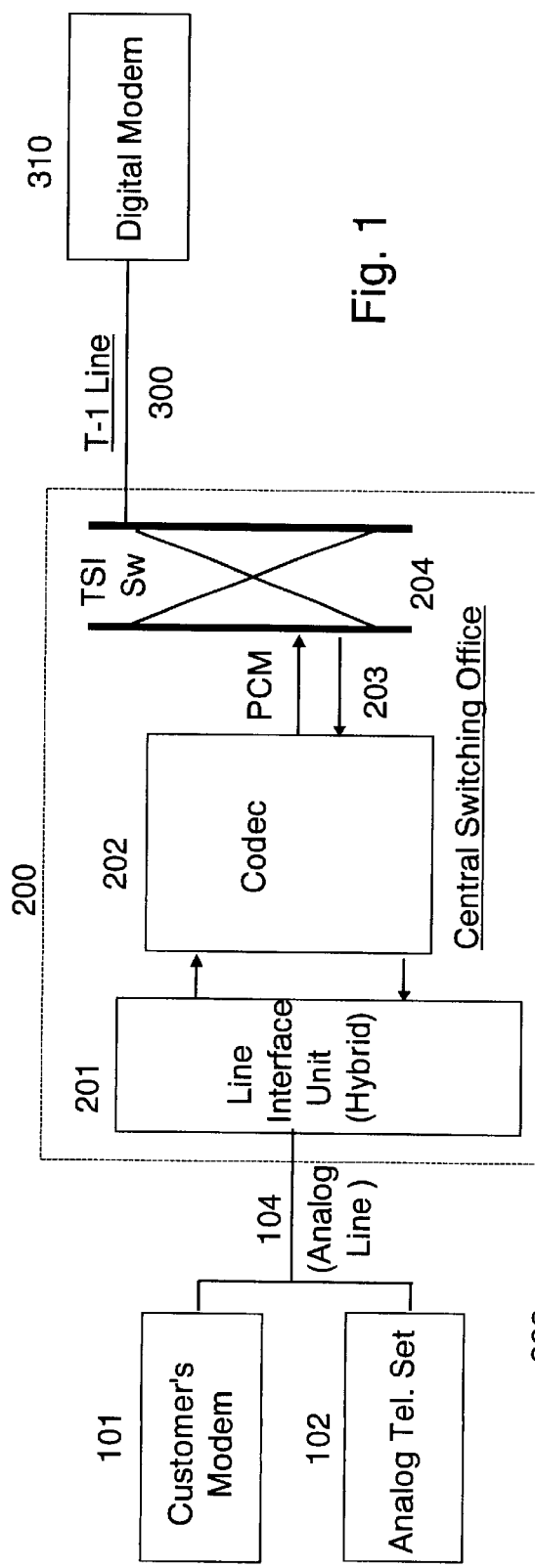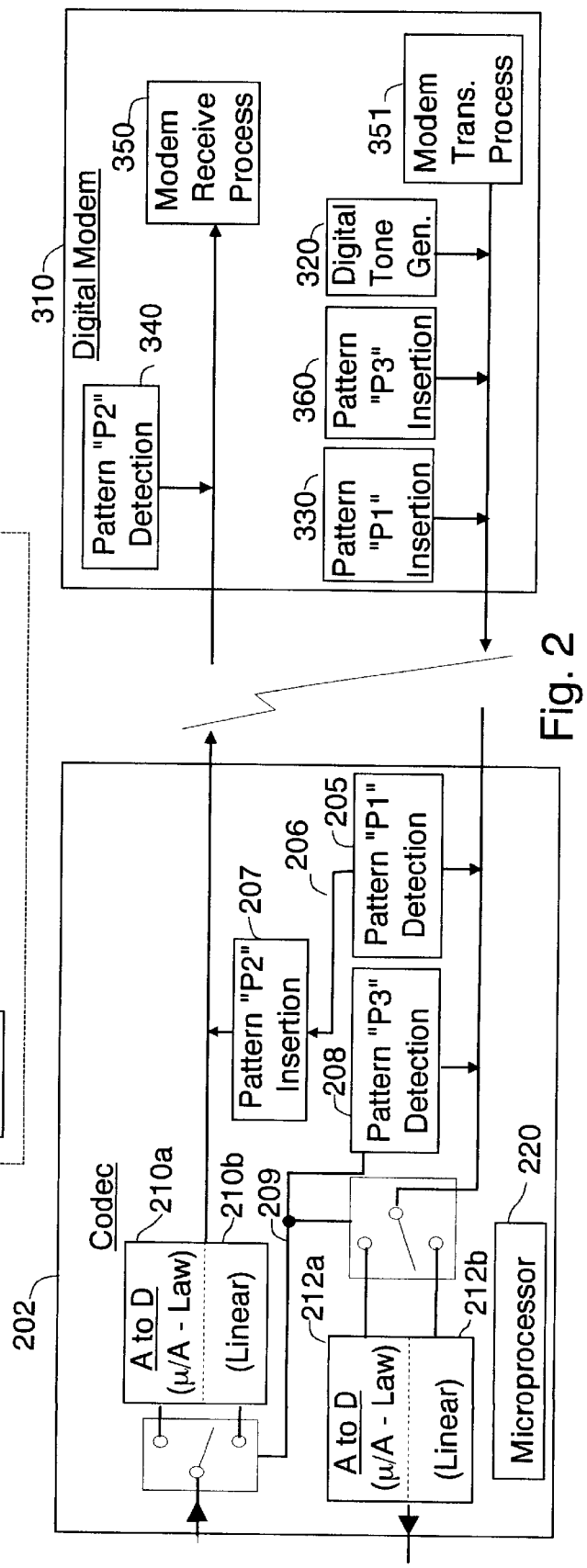
Fig. 1
Fig. 2

DATA OPTIMIZED CODEC

FIELD OF THE INVENTION

This invention relates to an improved codec for accommodating the transmission of digital information between an analog modem and a digital modem through a digital network and, more particularly, to a codec which facilitates higher speed data transmission.

BACKGROUND OF THE INVENTION

The public switched digital network (PSTN) was designed for voice transmission by sampling speech signals at an 8 kHz rate and encoding the sampled amplitudes into an 8-bit PCM code to provide a nominal channel capacity of 64 kb/s. However, the maximum achievable speed for data transmission is lower, for several reasons. Higher speed transmission can be effected through the use of techniques which raise the channel's SNR, such as are disclosed in U.S. Pat. No. 5,394,437. That patent describes how some of the effects of quantization noise can be overcome by synchronizing the sampling times of the client modem, as well as its slicing levels, to those employed at the network's PCM codec. Speeds approaching about 56 kb/s are then achievable between a digital modem that is directly connected to the digital switch by a digital line, such as T1 and an analog modem.

Although an 8-bit PCM code is transmitted through the PSTN at an 8 kHz rate, a small fraction of these bits are often used to provide signaling information (e.g., switchhook state, dialing and call progress status). Such signaling is called "robbed bit" or channel-associated signaling because the signaling bit displaces the least significant bit of the voice signal once every six samples. While the degradation of voice quality is tolerable, this technique additionally causes a loss of approximately 1.33 kbps from a modem's data rate.

At the network interface, analog voice signals, which typically exhibit a large amplitude range, are converted to the 8-bit digital PCM code by an A/D converter called a codec. However, in order to properly accommodate the large amplitude variation of voice signals, a quasi-logarithmic rule of conversion (the $\mu$-law or A-law rule) is employed. According to $\mu$-law conversion, unit step sizes are employed in the conversion of the sixteen smallest amplitude signals but step sizes, as great as 128 times as large, are employed to encode largest amplitude voice signals. A complete list of the 128 slicing levels employed in $\mu$-law conversion is set forth in FIG. 1 of U.S. Pat. No. 5,406,583. Although this approach is appropriate for keeping the signal to noise ratio (SNR) relatively constant regardless of amplitude for voice signals, it limits the achievable data rates for "56 k" or "v.pcm" modems to under 56 kbps. This is because it is extremely difficult for the analog "v.pcm" modem to distinguish low amplitude signals that are separated by one unit in the presence of residual intersymbol interference from neighboring symbols that may be 4000 times larger in amplitude.

It would be extremely advantageous to further overcome the effects of the quantization noise introduced by the network's PCM codec and thereby achieve higher transmission speed than the-less-than-56-kbps rate that is currently achievable by "v.90" or "56 k" modems.

SUMMARY OF THE INVENTION

In accordance with the principles of the present invention, in one illustrative embodiment thereof, the quantization levels of the network codec are made more suitable for data transmission rather than for voice communication. The digital modem will send a signal to the network codec that will cause the codec to recognize that a data call is being made that involves a connection to a digital modem. Upon recognizing that a data call is involved, the codec changes its mode of operation so that it discontinues using the $\mu$-law (or A-law) conversion rule that it employs on conventional voice calls and, instead, linearly converts the amplitudes of the analog data signal into equivalent digital codes as more commonly used in data communications. Advantageously, this recognition may take place during the transmission of the 2100 Hz answer-tone-with-phase-reversal (as specified in ITU-T Recommendation G. 165), that is sent by a modem incident to its being connected for use on a call. In the prior art this 2100 Hz tone was sent by a modem as a signal for the network to disconnect or bypass its echo cancellers in addition to providing an answer signal to the calling modem. In accordance with the present invention, the 2100 Hz tone will continue to be used for this purpose. However, the 8-bit digital PCM code that represents the instantaneous amplitudes of the 2100 Hz tone will not all be devoted to the generation of the tone. Instead, when a digital modem is connected, one or more of the least significant bit positions of the code representing the 2100 Hz tone can be allocated ("robbed") without materially detracting from the accuracy of the 2100 tone to signal to the associated codec that a digital modem connection has been made. These bits are then used to provide an indication to the network codec that a PCM modem connection is being made so that the codec can switch from $\mu$-law or A-law coding to linear coding.

BRIEF DESCRIPTION OF THE DRAWING

The foregoing and other features of the invention may become more apparent from the ensuing general description when read together with the drawing, in which:

FIG. 1 is a block diagram of a switched transmission path in which a PCM codec senses the connection of a digital modem to employ linear A/D conversion instead of the $\mu$-law or A-law conversion used with analog telephone sets and conventional modems; and FIG. 2 shows the details of the codec and digital modem of FIG. 1.

GENERAL DESCRIPTION

In FIG. 1, a central switching office 200 serves to effect interconnections among a plurality of analog lines extending to various customers' premises and to remote offices. Typical of the analog lines is line 104 extending to a conventional analog telephone set 102 and extending to a customer's modem 101. For extension of a connection from either modem 101 or telephone set 102 through time slot interchange switch 204, pulse code modulation (PCM) and four-wire paths are employed. A line interface unit 201, which may serve a plurality of bidirectional analog lines, contains a respective hybrid for converting each such analog line 104 to unidirectional, "four-wire" path. A well-known form of line interface unit is the T7536/L7585 chip set manufactured by Lucent Technologies Inc which serves 8 subscriber lines. In the four-wire path, a codec 202, which may be multiplexed (not shown) to serve a multiple of such line interface units, converts the analog signals from the line interface unit 201 into PCM code for transmission through switch 204. Codec 202 also converts the PCM signals received from switch 204 into analog signals for transmission through line interface unit 201 to analog line 104. A well-known form of codec is the T7531 manufactured by Lucent Technologies Inc which provides programmable per-channel features such as individual transmit and receive gain adjustments and provides for either µ-law or A-law conversion of analog signals under the control of a digital signal processor. The aforementioned line interface unit and codec are briefly described in D. G. Marsh et al U.S. Pat. No. 5,596,322 issued Jan. 21, 1997.

On a voice call, line interface unit 201 and codec 202 operate in tandem to accept the analog voice signals from line 104 and, using either µ-law or A-law conversion, translate such signals into PCM code for transmission through switch 204. Similarly, on a modem call from a conventional analog modem 102 to another analog modem (not shown), codec 202 employs the same µ-law or A-law conversion as would be employed on a voice call. However, in accordance with the present invention, on a call involving a connection from customer's modem 101 through central switching office 200 to digital modem 310, a different coding scheme is employed by codec 202. Since digital modem 310 is connected to central office 200 via a digital transmission line 300, for example, employing the well-known T1 format, signals from digital modem 310 toward modem 101 require no analog to digital conversion. However, the analog signals from customer's modem 101 must be converted to digital form to pass through switch 204. Heretofore, codec 202 would employ the same µ-law or A-law rules as would be used on a voice call. Also, it is standard practice for a digital modem, such as 310, to send back a 2100 Hz tone with phase reversal to cause any echo cancellers (not shown) in the transmission path to be de-activated, as well as signaling the calling modem 101 that the call is answered.

Conventionally, modem 310 answers by sending a 2100 Hz tone +/−15 Hz at a level of −12+/−6 dBm0 with periodic phase reversals every 450+/−25 milliseconds. In accordance with the principles of the present invention, as best seen in FIG. 2, when the 2100 Hz tone generator 320 is connected to apply the 2100 Hz tone to the transmission path, pattern P1 insertion circuit 330 goes into operation. Insertion circuit 330 advantageously employs a "bit robbing" technique to allocate one or more bit positions of the 8-bit PCM code generating the 2100 Hz tone. Into the allocated bit positions, advantageously the least two significant bit positions of the 8-bit code, a predetermined pattern "P1" is inserted. Advantageously, the pattern P1, can be a repetitive 16-bit pattern, the first 8 bits providing a pattern, such as 0xF0, to signify that a digital modem is connected on the call while the second 8 bits, coded as an unsigned integer, may represent the version supported by the digital modem. This pattern identifies to the transmission path that a digital modem connection has been made. Codec 202, in accordance with the invention, includes in the transmission path, a pattern P1 detection circuit 205 which responds to the appearance of pattern P1 to activate lead 206 connected to pattern P2 insertion circuit 207. Activation of lead 206 causes circuit 207 to transmit the P2 pattern towards the digital modem 310 acknowledging the receipt of the P1 pattern and to advise modem 310 that a linear PCM code codec is present. The P2 pattern may consist of 16 bits in bit positions 7 and 8 of the PCM samples corresponding to the signal transmitted from the codec towards the digital modem which may include, tones sent by modem 101 as well as the echo of the signal transmitted by the digital modem. The first 8 bits of this P2 pattern may comprise an acknowledgment pattern, such as 0xF1, while the second 8 bits, coded as an unsigned integer, may be employed to identify the version supported by the codec. In digital modem 310 the P2 pattern is detected by P2 pattern detection circuit 340. Through this exchange of the P1 and P2 patterns, the digital modem 310 establishes the presence of the linear mode capable codec in the connection. Simultaneously, using the initial handshaking signals used between the modem 101 and 310, such as the commonly used voice band signals standardized in ITU-T Recommendation v.8 and v.8 bis, digital modem 310, modem receive process 350 ascertains the presence of linear mode capable analog modem 101. With both segments of the linkage in place, i.e., from linear mode capable analog modem 101 to linear mode capable codec 202 and from linear mode capable codec 202 to modem 310, the digital modem transmit process 351 activates pattern P3 insertion circuit 360 to send pattern P3 to codec 202. In codec 202 pattern P3 detection circuit 208 responds to the P3 pattern to activate lead 209 which causes the linear mode operation to be employed in A/D conversion by circuit 210 and D/A conversion by circuit 212 at an appropriate point in the training sequence. Absent support for linear mode from either the codec or the analog modem, the digital modem 310 does not send pattern P3 and the call proceeds according to the prior art.

As mentioned, in response to the receipt of the P3 pattern, codec 202 activates its linear A to D translating section 210b to thereafter translate upstream analog signals received from the customer into digital form. In the downstream side of the channel, codec 202 will advantageously activate its linear D to A translating section 212b to convert the usual 8-bit PCM code received from digital modem 310 into a 16 bit linear code by shifting in 8 zeroes as the least significant byte. Advantageously, the codec may then pass the 16-bit pattern through a Tomlinson filter (not shown) for pre-coding compensation. At the output of the Tomlinson filter the signals will be further processed by the receive circuitry of the codec in the same manner as it conventionally processes 16 bit linear equivalents of the µ-law code words during normal mode.

What has been described is deemed to be illustrative of the principles of the illustrative embodiment. Further and other modifications will be apparent to those skilled in the art and may be made without, however, departing from the spirit and scope of the invention.

What is claimed is:

1. In a system having a digital modem and a codec providing an interface for signals between a subscriber line and a digital network, said codec being selectively capable of PCM encoding according to µ-law, A-law or other encoding law, the improvement comprising:
   a. means for sensing when a remote digital modem is connected over said digital network to said codec serving an analog modem on said subscriber line; and
   b. means responsive to said sensing means detecting the connection of said remote digital modem for controlling said codec to employ said other encoding law to convert signals between said remote digital modem and said analog modem.

2. A system according to claim 1 wherein said other encoding law is a linear PCM encoding law and wherein said sensing, means detects the capability of said remote digital modem to respond to said linear encoding law.

3. A system according to claim 2 wherein said remote digital modem transmits a digitally generated capability-identifying tone incident to its being connected to said network.

4. A system according to claim 3 wherein said digitally generated tone is 2100 Hz with periodic phase reversals.

5. A system according to claim 3 wherein a predetermined pattern is inserted in the least significant bit positions of said digitally generated tone to identify the capabilities of said digital modem.

6. A line card for interfacing an analog subscriber line to a digital telephone network, said line card having a codec for normally employing μ-law or A-law rules for converting between PCM codes and analog signals, the improvement comprising:
   a. means for sensing when a remote digital modem is selected for use on a connection through said digital network with said analog line; and
   b. means responsive to said sensing means for controlling said codec to employ an encoding rule other than μ-law or A-law to convert between said PCM codes and said analog signals.

7. A line card for interfacing an analog subscriber line to a digital telephone network, said line card having a codec for normally employing μ-law or A-law rules for converting analog signals into a PCM code, the improvement comprising:
   a. means for sensing when a remote digital modem is selected for use on a connection through said digital network with said analog line; and
   b. means responsive to said sensing means for controlling said codec to employ an encoding rule other than μ-law or A-law to convert said analog signals into PCM code.

8. In a digital modem having a tone generator for digitally generating an answer tone, the improvement comprising:
   means for inserting a predetermined pattern into the least significant bits positions of said digitally generated tone to identify capabilities present in said digital modem;
   means responsive to a bit pattern from a codec normally adapted to operate according to μ-law or A-law indicating that said codec is capable of operating according to a modified PCM coding law other than μ-law or A-law when said codec is serving a subscriber line using an analog modem; and
   means for sending a further bit pattern to said codec to cause said codec to operate according to said modified PCM coding law when said codec is serving said subscriber line using said analog modem.

9. A method of controlling a codec interfacing an analog subscriber line to a digital telephone network, said codec normally employing μ-law or A-law rules for converting between PCM code and analog speech or data, comprising the steps of:
   receiving at said codec a signal from a remote digital modem selected for use on a connection through said digital network with said codec indicating that said remote modem is present for the receipt of said data;
   responding to said signal to inform said remote digital modem that said codec is capable of linear PCM encoding; and
   responding to a further signal from said remote digital modem to cause said codec to employ a linear encoding rule to convert between PCM code and said analog data.

10. A method according to claim 9 wherein said signal from said remote digital modem includes a digitally generated tone containing a predetermined pattern.

11. A method according to claim 10 wherein said predetermined pattern is contained in the least significant bit positions of said digitally generated tone.

12. A method according to claim 11 wherein said tone is generated incident to said modem being selected for use on said connection with said analog line.

13. A method of controlling a codec in a line card for interfacing an analog subscriber line to a digital telephone network, said codec normally employing μ-law or A-law rules for converting analog signals into PCM code, comprising the steps of:
   a. sensing when a remote digital modem is selected for use on a connection through said digital network with said analog line; and
   b. responding to said sensing by controlling said codec to employ a linear encoding rule to convert said analog signals into PCM code.

14. In a codec for translating PCM code into analog signals under the control of a microprocessor, the improvement comprising
   a) means normally operative on conventional voice calls for translating said PCM code into analog signals using μ-law or A-law rules of conversion;
   b) means for sensing the connection of a remote digital modem to said codec; and
   c. means responsive to said sensing means for controlling said translating means to linearly convert PCM code into said analog signals.

15. In a codec for translating analog signals into PCM code under the control of a microprocessor, the improvement comprising:
   a. means normally operative on conventional voice calls for translating said analog signals into PCM code using μ-law or A-law rules of conversion;
   b. means for sensing the connection of a remote digital modem to said codec capable of exchanging capability signals with said codec; and
   c. means responsive to said sensing means for controlling said normally operative translating means to linearly convert said analog signals into PCM code.

16. A digital modem for interfacing to a digital telephone network having a codec which normally employs μ-law or A-law rules for converting between network PCM codes and subscriber line analog signals, the improvement comprising:
   means for inserting a first capability identifying pattern (P1) in predetermined bit positions in signals sent to said network codec by said digital modem to cause said codec to operate according to a modified PCM coding law other than μ-law or A-law.

17. A digital modem according to claim 16, wherein said modem upon being connected through said network transmits an answer-tone-with-phase-reversal to said codec.

18. A digital modem according to claim 17, wherein said first identifying bit pattern (P1) is contained within predetermined bit positions of said answer tone.

19. A digital modem according to claim 18 wherein said modified PCM coding law is a substantially linear encoding law and wherein said first identifying bit pattern causes said codec to operate according to said substantially linear PCM coding law.

20. A digital modem for interfacing to a digital telephone network having a codec which normally employs μ-law or A-law rules for converting between network PCM codes and subscriber line analog signals, the improvement comprising:
   means for inserting a first identifying pattern (P1) in predetermined bit positions in signals sent to said network codec to cause said codec to operate according to a modified PCM coding law other than μ-law or A-law, further including means responsive to a second identifying bit pattern (P2) from said codec indicating that said codec is capable of operating according to a modified coding law other than μ-law or A-law and for sending a third identifying bit pattern (P3) to said codec to cause said codec to operate according to said modified PCM coding law.

21. A network codec having quantization levels normally adapted for voice communication, characterized in that:

said codec contains detection circuitry for sensing a signal transmitted through said network incident to the connection of a digital modem with said codec to discontinue use of said quantization levels appropriate for voice communications and substitute quantization levels appropriate for linear conversion of analog data signals into equivalent digital codes.

22. In a system having a digital modem and a codec providing an interface for signals between a subscriber line and a digital network, said codec being selectively capable of PCM encoding according to μ-law, A-law or other encoding law, the improvement comprising:

a. means for sensing when a remote digital modem is connected over said digital network to said codec serving an analog modem on said subscriber line; and
b. means at said codec responsive to said sensing means for
  (i) receiving over said network from said digital modem a signal that a data call is being made, said signal including one or more of the least significant bit positions of a code representing a digital modem answer tone;
  (ii) controlling said codec to employ said other encoding law to convert signals between said remote digital modem and said analog modem; and
  (iii) transmitting over said network to said digital modem a signal advising said digital modem that said codec has linear PCM encoding capability.

23. A system according to claim 22 further comprising means at said codec responsive to a further signal from said digital modem to employ said linear PCM encoding capability on said data call.

* * * * *